United States Patent

[11] 3,536,208

| [72] | Inventors | Phillip J. Maddex<br>Eastchester, N.Y., and Ole Skaarup<br>Greenwich, Conn., both c/o Skaarup<br>Shipping Corp., 21 W. St., New York, N.Y.<br>10006);<br>Ole Skaarup, Greenwich, Connecticut (c/o<br>Skarrup Shipping Corp., 21 W. St. New<br>York, NY 10006) |
|------|-----------|---|
| [21] | Appl. No. | 806,911 |
| [22] | Filed | March 13, 1969 |
| [45] | Patented | Oct. 27, 1970 |

[54] SELF-DISCHARGING BULK CARGO VESSEL
8 Claims, 8 Drawing Figs.

[52] U.S. Cl. .................................................. 214/15
[51] Int. Cl. .................................................. B63b 27/22
[50] Field of Search ..................................... 214/17.8,
17.82, 14, 15, 15(E), 16

[56] References Cited
UNITED STATES PATENTS

| 506,840 | 10/1893 | Briggs............................ | 214/15 |
| 1,089,496 | 3/1914 | Read.............................. | 214/15 |
| 1,585,268 | 5/1926 | Sensibar........................ | 214/15 |
| 1,737,343 | 11/1929 | Sensibar........................ | 214/15 |
| 1,942,839 | 1/1934 | Sheal et al..................... | 214/15 |
| 3,069,027 | 12/1962 | Dischinger.................... | 214/16X |
| 3,384,248 | 5/1968 | Leitch et al................... | 214/15X |

FOREIGN PATENTS

| 1,044,711 | 11/1958 | Germany....................... | 214/14 |
| 752,731 | 7/1956 | Great Britain................. | 214/15(D)UX |

Primary Examiner—Gerald M. Forlenza
Assistant Examiner—Frank E. Werner
Attorney—Webb, Burden, Robinson and Webb ABSTRACT: A self-discharging bulk cargo vessel in which at least one longitudinally orientated conveyor is disposed within the cargo hold. The conveyor is separated from the cargo hold by a wall provided with gates for controlling the flow of the bulk cargo to the conveyor. At one end of the longitudinal conveyor is an elevating means for moving the bulk cargo out of the hold. At least one transverse portable conveyor is arranged to deliver bulk cargo to the longitudinal conveyor. A portable loading means is arranged to cooperate with the transverse conveyor and loads the conveyor with that portion of the bulk cargo which cannot be fed to the longitudinal conveyors by gravity.

INVENTORS.
Phillip J. Maddex
Ole Skaarup

Patented Oct. 27, 1970

INVENTORS.
Phillip J. Maddex
Ole Skaarup

BY

Webb, Burden, Robinson & Webb

THEIR ATTORNEYS

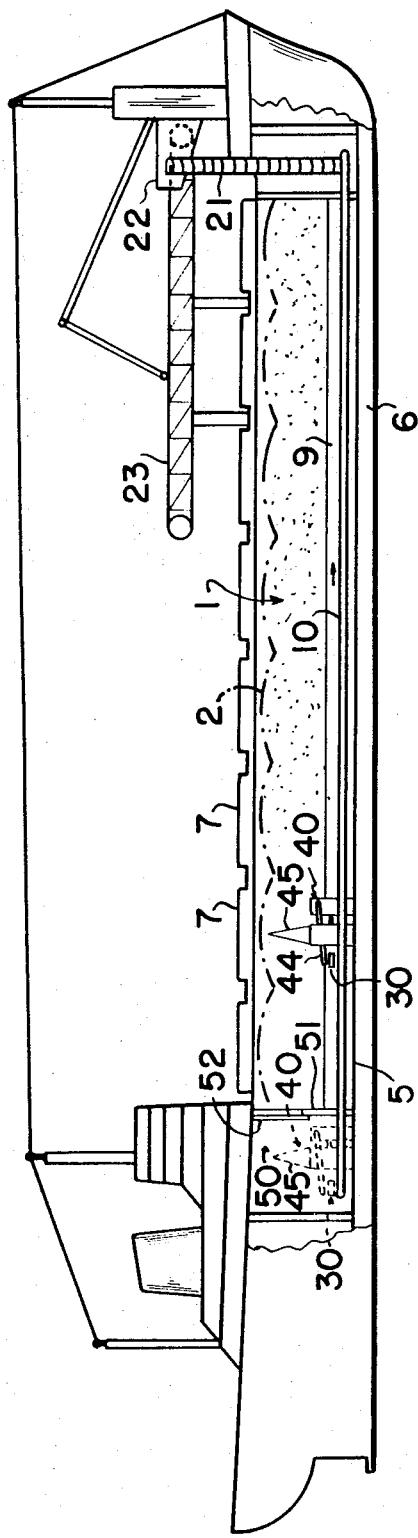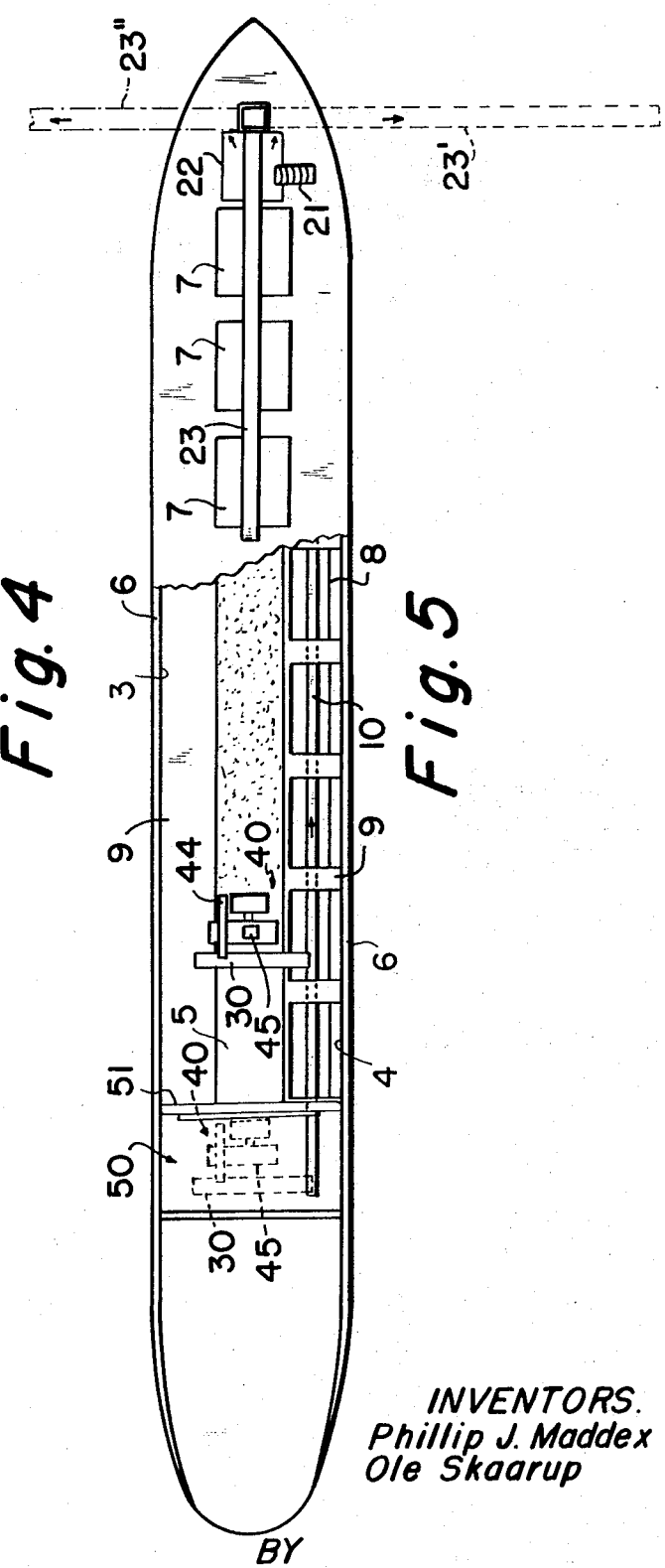

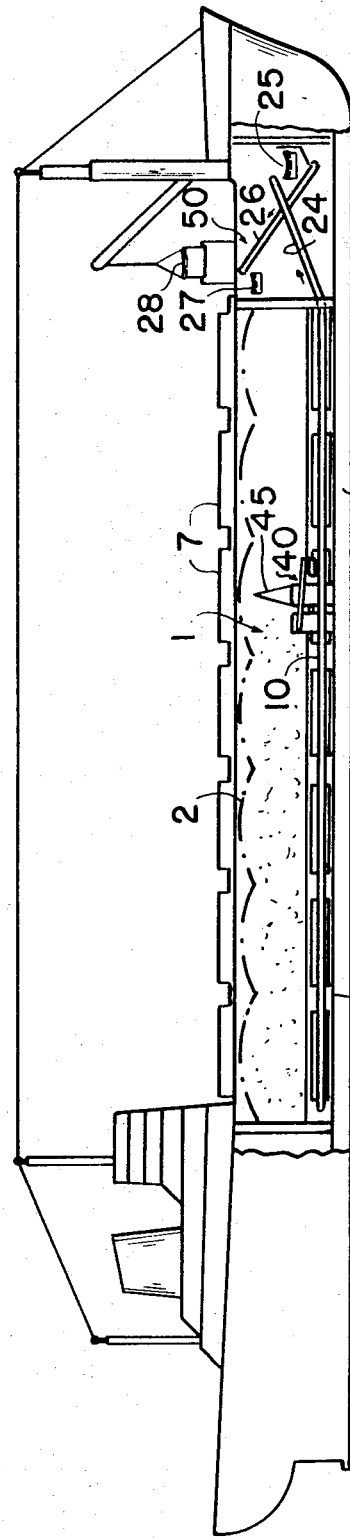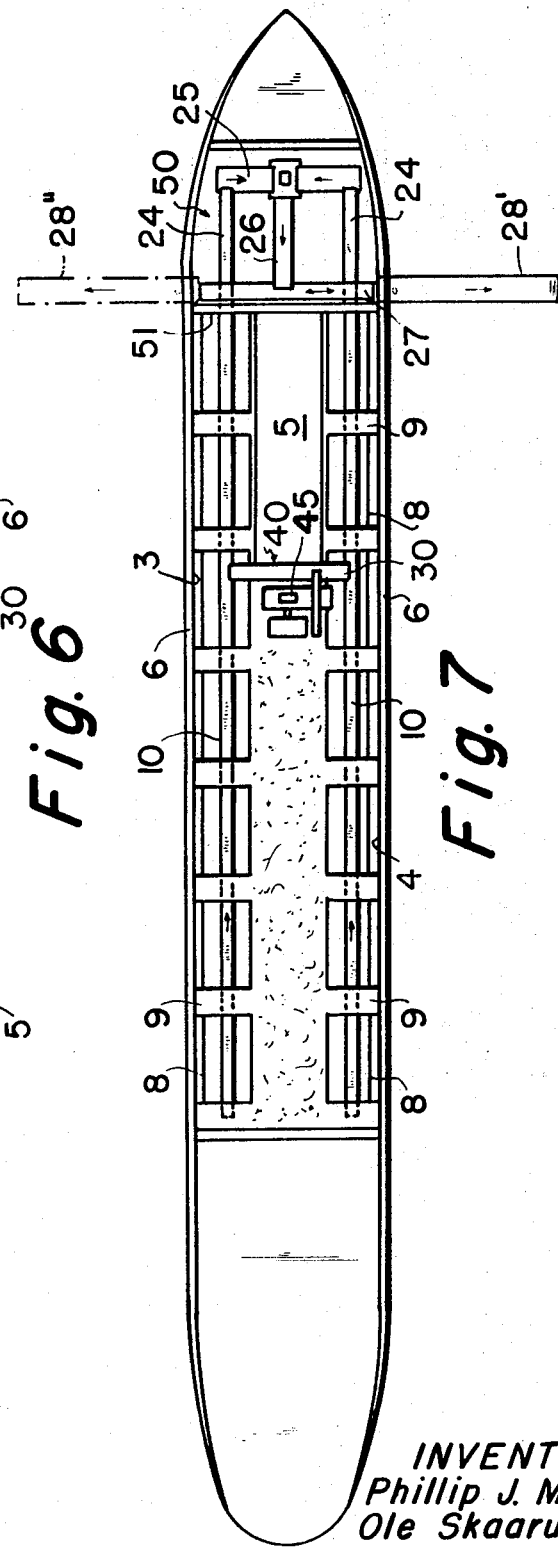

3,536,208

SELF-DISCHARGING BULK CARGO VESSEL

BACKGROUND

Most bulk cargo vessels are designed to be unloaded with shore cranes and equipment. Some are designed to be self-discharging with ship-mounted cranes. Still others are self-discharging with conveyor belts fitted beneath hopper bottom holds. Conventional hopper bottom or sloping bottom discharge vessels deliver the bulk contents of the hold to a conveyor belt by gravity flow. Standard designs employ the design practices of storage bins and storage silos. Accordingly, the bottoms are designed with slopes of 45° to 60° and sometimes steeper.

Prior hopper bottom self-discharging vessels have had several drawbacks: Because of the complexity of the bottoms of such vessels, they are very costly. The hopper bottom vessels greatly reduce the available cargo volume of the ship. Additionally, because of the varying flow characteristics of bulk materials which might be transported in the vessels such as grain, coal, iron ore pellets, etc., it is difficult to design hopper bottoms which will efficiently discharge these diverse materials by gravity flow.

Self-discharging vessels, according to this invention, eliminate the disadvantages of the prior hopper bottom vessels providing increased cargo volume for the same hull size and great flexibility for handling bulk materials having very different properties. The overall simplicity of vessels according to this invention results in a trouble free and economical construction.

THE INVENTION

Briefly, according to this invention, there is provided a bulk cargo vessel having generally vertical an elongate port and starboard bulkheads, fore and aft bulkheads and a generally horizontal bottom defining the cargo hold. At least one conveyor is longitudinally disposed preferably adjacent the base of a bulkhead. Means are provided at the end of the longitudinal conveyor for elevating the bulk cargo out of the hold. A wall separates and protects the longitudinal conveyor from the cargo and is provided with at least one gate for controlling the flow of bulk cargo from the hold to the longitudinal conveyor. At least one portable conveyor is arranged transversely within the hold for delivering bulk cargo to the longitudinal conveyor or conveyors. A portable loading device is arranged to cooperate with the transverse conveyor so that the portion of the bulk cargo which cannot be discharged by gravity flow into the longitudinal conveyor may be discharged from the hold of the vessel. According to a preferred practice of this invention, longitudinal conveyors are provided at the base of both the port and the starboard bulkheads. The walls separating the longitudinal conveyors from the cargo hold are preferably provided with a plurality of gates which can be separately opened and closed thereby permitting a substantially uniform unloading by gravity flow along the length of the vessel. It is also preferable that a portable conveyor and portable loading device be arranged to work from both the fore and aft of the vessel enabling a substantially balanced unloading of the vessel. A compartment is preferably provided adjacent either the fore or aft bulkhead of the cargo hold to protect the transverse conveyor and portable loading device when the hold is filled with bulk cargo. This compartment is separated from the hold by a door. Preferably, the transverse conveyor is arranged to deliver cargo to the longitudinal conveyors when it is disposed within the protective compartment. This facilitates the operation and unloading of the cargo when unloading first begins or after further unloading can no longer be achieved by gravity flow. It is especially desirable if the device for loading the transverse conveyor is provided with an elongate structure or boom for shaping the slope of the bulk materials within the hold and promoting gravity flow to the longitudinal conveyors. It is also desirable if tracks or guides are provided for the transverse conveyor and loading device.

Most bulk carriers are designed with several holds to separate several kinds of cargo. Vessels according to this invention would have only one or at most two holds as the ship would carry only one cargo at a time. The structural members crossing the ship between bulkheads will have an open span at the bottom of the hold to provide for the passage of the transverse conveyor and a loading device through the length of the hold.

A further description of vessels according to this invention will be made with reference to the drawings in which:

FIGS. 4 and 5 are respectively a broken away side elevation and plan view of a vessel demonstrating another mode; and FIGS. 6 and 7 are respectively a broken away side elevation and plan view of a vessel demonstrating yet another mode.

Figure 1:
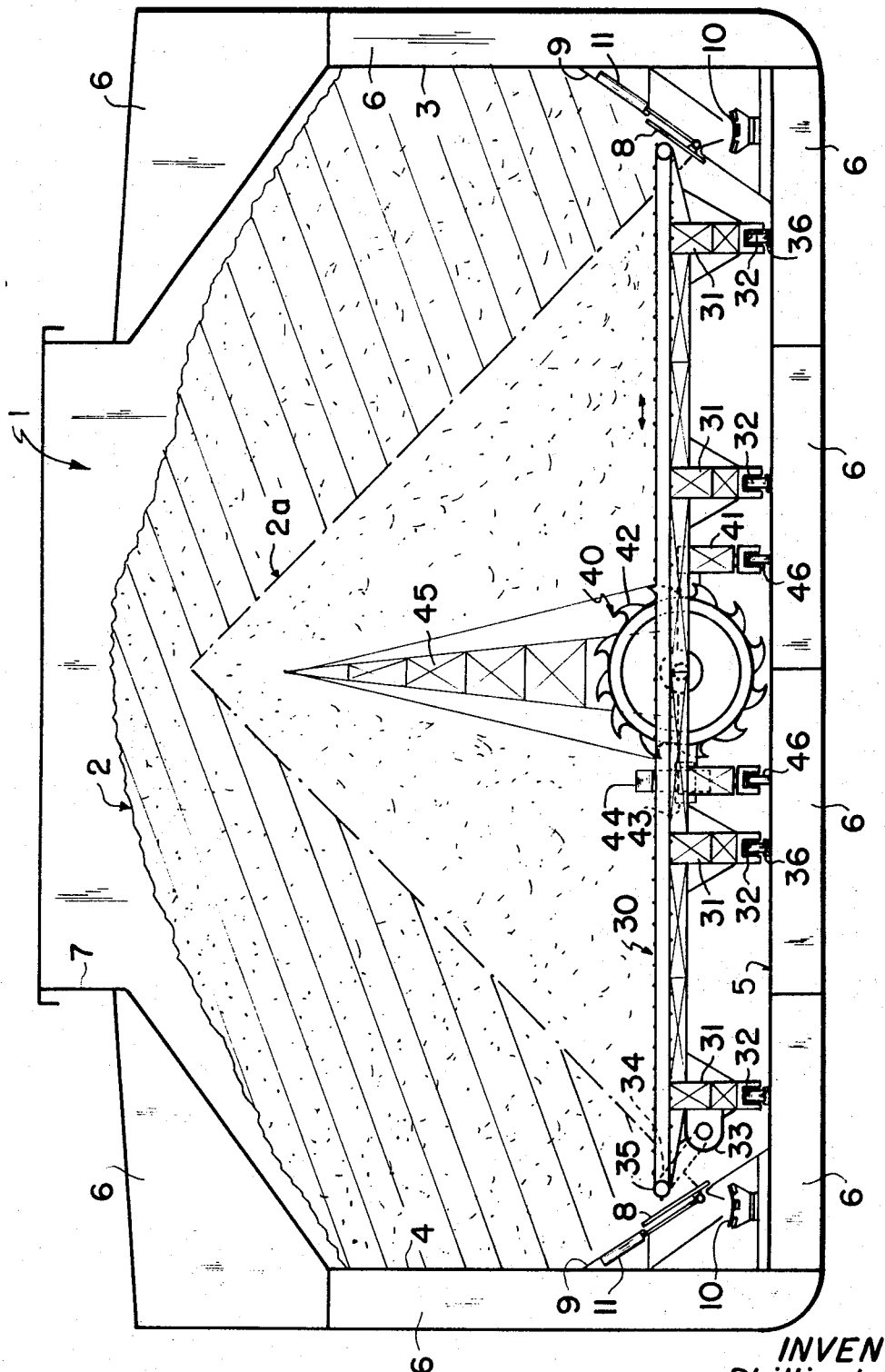
FIG. 1 is a schematic midship section of a bulk cargo vessel according to this invention.

Referring now to FIG. 1 showing a cross section through a cargo hold 1 partially filled with a bulk cargo 2, the cargo hold is defined by starboard 3 and port 4 and a bottom 5. Ballast and fuel chambers 6 are shown disposed about the inner bulkhead and floor. Hatches 7 are provided at the top of the cargo hold for loading. The longitudinal conveyors 10 disposed adjacent the bulkheads are shown in section. Walls 9 separate the conveyors from the hold. The walls are provided with gates 8 which can be remotely actuated to open and close.

The conveyors can be any of the well known types including ribbon conveyors, scraper conveyors, flight conveyors, apron conveyors, continuous flow conveyors or bucket conveyors. The means for actuating the gates may, for example, be hydraulic cylinders and pistons 11 secured at one end to the gate and at the other end to the separating wall. In FIG. 1, the separating wall is shown in its preferred form as a sloping or diagonally disposed structure between the bulkhead and the cargo floor.

A transverse conveyor 30 is supported at a height sufficient to pass bulk material through the gates 8 in the separating walls 9 to the longitudinal conveyors 10. In the drawings, it is shown supported by four standards 31. At the base of the standard are wheels 32 which enable the conveyor 30 to be moved longitudinally. According to one embodiment of this invention, longitudinal tracks 36 are provided for guiding the wheels 32. The conveyor belt is driven by at least one motor 33 connected by chain or some other suitable type drive 34 to a terminal sprocket 35.

The loading device 40 for placing bulk material upon the transverse conveyor is shown in the drawing having a frame 41 with casters 46 at the base thereof. (The loading device is shown in side elevation in FIG. 3a.) A rotating bucket elevator 42 carries the bulk material from the floor of the hold and delivers it to a hopper 43 which feeds a short conveyor 44 that delivers the cargo to the transverse conveyor. Mounted on the loading device is an elongate boom 45 or slope cutter which can be used to shape the surface of the bulk cargo and to promote gravity flow to the longitudinal conveyors. Assuming an angle of repose of 45°, the shaded portion of the cargo above line 2a can be emptied by gravity flow.

Figure 2:
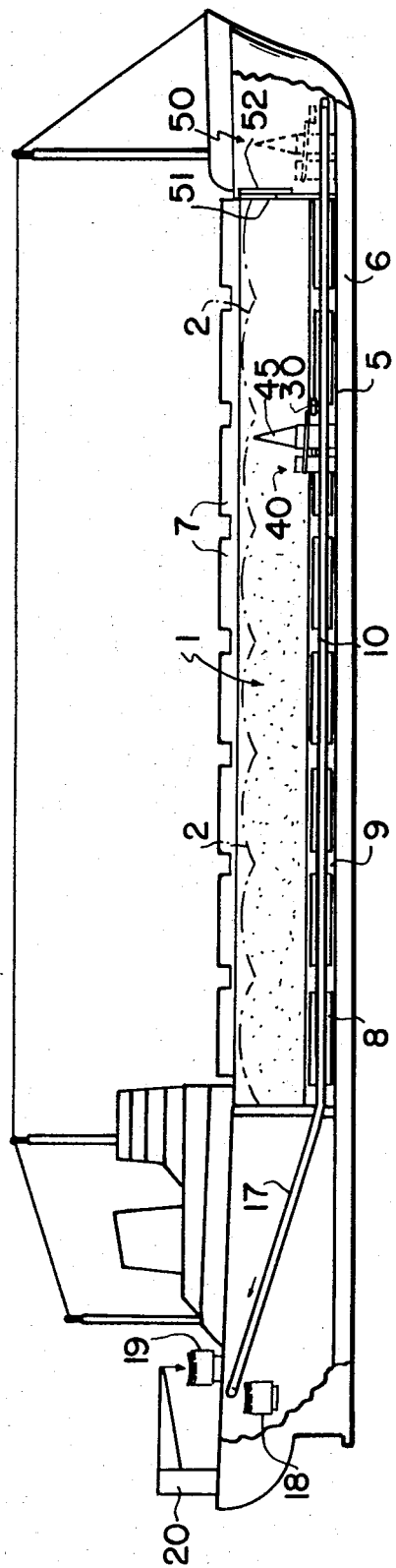
FIGS. 2 and 3 are respectively a broken away side elevation and a plan view of a bulk cargo vessel demonstrating one mode of practicing this invention.
Figure 3:
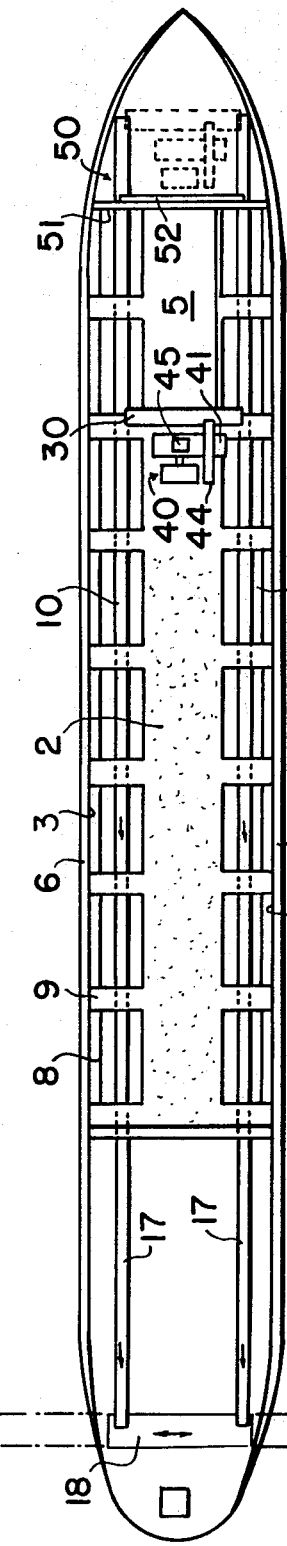
Figure 3A:
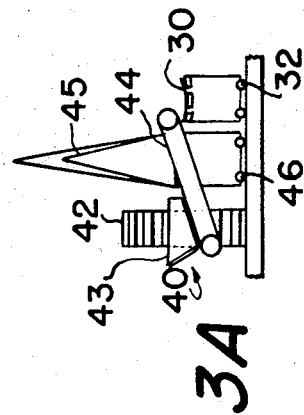
FIG. 3a is an enlarged schematic side elevation of a portable loading device and transverse conveyor.

Referring now to FIGS. 2 and 3 which show one mode of practicing this invention whereby two longitudinal conveyors 10 feed an inclined conveyor 17 which moves the bulk cargo to a shuttle conveyor 18. In FIGS. 2 and 3 the shuttle conveyor is shown with an extension 19 positionable by a deck crane 20 in alternate positions 19' and 19''. The vessel is shown with a plurality of hatches 7 for loading bulk cargo. Longitudinal conveyors 10 are positioned along both the port and starboard bulkheads. The transverse conveyor 30 and the loading device 40 are shown amid ships unloading cargo and alternately in the protective compartment 50 provided therefore. The protective compartment is separated by partial wall 51 and a sliding door 52 from the cargo hold 1. The wall 51 extends down from the top of the cargo hold. The elongate conveyors 10 are shown extending into the protective compartment a sufficient distance such that they can be fed by the transverse conveyor when the loading device is first emerging from the protective compartment.

Referring now to FIGS. 4 and 5, which show an alternate mode of practicing this invention, there is only one conveyor 10 positioned along the base of the starboard bulkhead. A bucket elevator 21 is positioned in a fore compartment. The longitudinal conveyor delivers bulk material to the bucket elevator which elevates it to a hopper 22 which feeds a deck boom conveyor 23, which may be swung to positions 23' and 23". The transverse conveyor 30 and the loading device 40 is shown amid ships and alternately in the protective compartment 50 aft of the cargo hold 1.

Referring now to FIGS. 6 and 7 which illustrate yet another alternate mode of practicing this invention, two longitudinal conveyors 10 are provided along the base of the port and starboard bulkheads. The longitudinal conveyors deliver bulk cargo to inclined conveyors 24 which elevate the cargo to transverse conveyors 25 which delivers into inclined conveyor 26. The cargo is then moved by shuttle conveyor 27. A shuttle conveyor extension 28 is shown in alternate positions 28' and 28". The transverse conveyor 30 and loading device 40 are shown amid ships.

Other modes of practicing this invention should be readily apparent to those skilled in the art after a study of the embodiments shown in FIGS. 1—7.

The self-discharging vessel operates substantially as follows: The gates 8 open permitting a substantial portion of the bulk cargo 2 to be fed to the longitudinal conveyors 10 by gravity flow. The longitudinal conveyors carry the bulk material to the elevating means positioned at either end thereof. After it is no longer possible to feed the longitudinal conveyors by gravity flow the transverse conveyor and loading device are moved out of their protective compartment 50 and through the hold, scooping bulk cargo from the floor of the hold, and delivering it to the longitudinal conveyors.

Two loading machines and transverse conveyors may be used in the hold, one operating in the fore end and the second operating in the aft end of the hold. Where it is desired to keep construction costs at a minimum, the ship can be fitted with only one conveyor, as shown in FIGS. 4 and 5. It should be understood that the unloading system described could be used in a barge as well as a ship. The advantages are the same and produce an opportunity to unload bulk material by substantially automated equipment that requires very little man power and operates at low cost. The self-discharging vessel described has wide flexibility for handling diverse bulk cargos.

If high density cargos such as iron ore or iron ore pellets are carried, the hold will only partially be filled. If, on the other hand, low density cargo is carried, the full dead weight capacity of the ship will be used as a result of the high volume of the ship or vessel. Also, a wide range of unloading rates can be achieved as one or both of the longitudinal conveyors may be used. Furthermore, a wide variation of material properties can be feasibly handled. This is important to ensure wide range of cargos resulting in diverse back hauling combinations.

We claim:

1. A self-discharging bulk cargo vessel comprising generally vertical and longitudinal port and starboard bulkheads, and generally horizontal bottom defining a cargo hold, at least one longitudinally disposed conveyor, at least one means for elevating cargo disposed at the end of the longitudinal conveyor, a wall separating the longitudinal conveyor from the hold, at least one gate in the wall for controlling the gravity flow of bulk cargo from the hold to the longitudinal conveyor, at least one transverse portable conveyor arranged to deliver bulk cargo to the longitudinal conveyor, and portable means for loading bulk cargo on the transverse conveyor, said hold having an open span at the bottom thereof to provide for passage of the transverse conveyor and portable means, said portable means comprising means enabling it to be moved transversely such that it can cooperate with the transverse conveyor for removing the cargo which cannot be fed to the longitudinal conveyors by gravity flow.

2. A vessel according to claim 1 having longitudinal conveyors and separating walls adjacent both port and starboard bulkheads.

3. A vessel according to claim 2 having a plurality of gates in each separating wall to permit substantially uniform unloading along the length of the vessel.

4. A vessel according to claim 3 having means for elevating the bulk cargo disposed both fore and aft of the vessel.

5. A vessel according to claim 3 having two portable transverse conveyors and portable loading means enabling a substantially balanced unloading of the vessel.

6. A vessel according to claim 1 in which a protective compartment is provided at one end of the vessel for the portable transverse conveyor and the portable loading means which permits the conveyor and loading means to be operated when unloading first begins.

7. A vessel according to claim 1 in which the separating walls are diagonally disposed between the bulkhead and the floor of the hold.

8. A vessel according to claim 1 in which means are provided for guiding and moving the portable transverse conveyor and loading means.